US 9,637,183 B2

(12) United States Patent
Conny

(10) Patent No.: US 9,637,183 B2
(45) Date of Patent: May 2, 2017

(54) AERODYNAMIC DEVICE FOR A VEHICLE

(71) Applicant: Trailstar International, Inc., Alliance, OH (US)

(72) Inventor: Michael A. Conny, Beloit, OH (US)

(73) Assignee: Trailstar International, Inc., Alliance, OH (US)

(*) Notice: Subject to any disclaimer, the term of this patent is extended or adjusted under 35 U.S.C. 154(b) by 3 days.

(21) Appl. No.: 14/605,416

(22) Filed: Jan. 26, 2015

(65) Prior Publication Data
US 2016/0214660 A1 Jul. 28, 2016

(51) Int. Cl.
*B62D 35/00* (2006.01)

(52) U.S. Cl.
CPC .......... *B62D 35/001* (2013.01); *B62D 35/004* (2013.01)

(58) Field of Classification Search
CPC .............................. B62D 35/001; B62D 35/004
USPC ...................... 296/180.2, 180.3, 180.1, 180.4
See application file for complete search history.

(56) References Cited

U.S. PATENT DOCUMENTS

| 3,834,752 | A | * | 9/1974 | Cook | ................... | B62D 35/004 |
| | | | | | | 296/180.2 |
| 4,741,569 | A | | 5/1988 | Sutphen | | |
| 4,978,162 | A | | 12/1990 | Labbe | | |
| 6,286,894 | B1 | | 9/2001 | Kingham | | |
| 6,666,498 | B1 | | 12/2003 | Whitten | | |
| 6,685,256 | B1 | | 2/2004 | Shermer | | |
| 8,025,329 | B1 | | 9/2011 | Kron | | |
| 8,573,680 | B2 | | 11/2013 | Smith | | |
| 2003/0132644 | A1 | | 7/2003 | Crews | | |
| 2010/0181799 | A1 | | 7/2010 | Ryan et al. | | |
| 2014/0361579 | A1 | * | 12/2014 | Alguera Gallego | . | B62D 35/001 |
| | | | | | | 296/180.2 |

FOREIGN PATENT DOCUMENTS

| IE | WO 2013182618 A1 * | 12/2013 | ........... B62D 35/004 |
| IT | EP 1870320 A2 * | 12/2007 | ........... B62D 35/001 |

* cited by examiner

*Primary Examiner* — Joseph D Pape
*Assistant Examiner* — Dana Ivey
(74) *Attorney, Agent, or Firm* — Sand & Sebolt

(57) ABSTRACT

An aerodynamic device includes an inflatable member convertible between a deflated position and an inflated position at a speed certain. When in the inflated position, the inflatable member on the aerodynamic device extends between the cabin wall on a vehicle and a leading wall on a container supported by a trailer towed by the vehicle. The inflatable member fills a gap ordinarily between the cabin wall and trailer to encourage laminar flow as truck hauls trailer through an air stream. The encouragement of laminar flow reduces drag which results in increase fuel economy for the truck's engine, amongst other advantages.

17 Claims, 9 Drawing Sheets

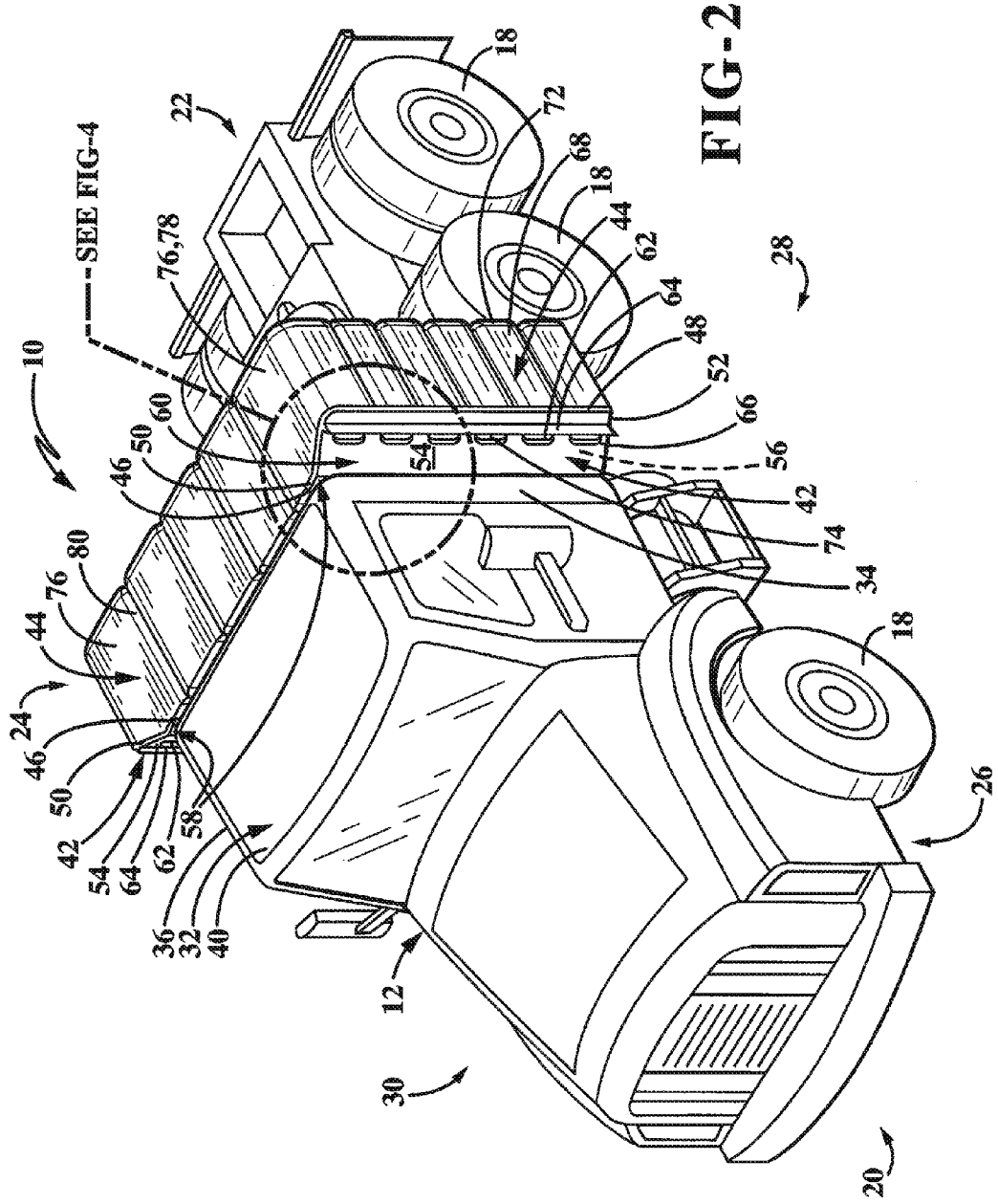

AERODYNAMIC DEVICE FOR A VEHICLE

BACKGROUND OF THE INVENTION

Technical Field

The present invention relates generally to the field of aerodynamic devices to reduce drag. More particularly, the present invention relates to an aerodynamic device that is adapted to extend between a cabin on a truck and a trailer to reduce drag forces ordinarily originating in a gap defined between the cabin and the trailer. Specifically, the present invention relates to an inflatable member adapted to be coupled to the truck and extending rearwardly towards the trailer in the gap.

Background Information

A semi-tractor trailer-truck has advantages over a personal small pickup truck in that it can carry much larger cargo. One disadvantage, however, is that there is a gap between a tractor and a trailer which will increase the aerodynamic drag of the tractor-trailer combination compared to a smaller vehicle. The gap is between the rear of the tractor cabin and the front of the trailer. The gap causes a large drag on the truck thereby greatly reducing the fuel economy thereof.

It has been estimated that a significant amount of the fuel burned by tractor-trailers is to overcome aerodynamic drag. As a result, even a small reduction in aerodynamic drag may have a significant impact on the amount of fuel consumed. Additionally by consuming less fuel, trucking companies reduce cost, which they may pass along to the consumers. Many attempts have been made to reduce the aerodynamic drag of tractor-trailers. Generally, these attempts are directed to drag created by the motion of the tractor-trailer rigs through the ambient air stream. For example, sloped tops, side extender fairings, and side skirt bottoms have been added to the tractors.

SUMMARY

Issues continue to exist with these known aerodynamic devices because they are inflexible, large, and rigid. The present invention addresses these and other issues.

In one aspect, the invention may provide an aerodynamic device comprising: an inflatable member adapted to be coupled to a vehicle; a speed certain at which the inflatable member converts from a deflated position to an inflated position; and a first sidewall on the inflatable member adapted to extend rearwardly from adjacent a cabin wall on the vehicle when the member is in the inflated position.

In yet another aspect, the invention may provide an aerodynamic device comprising: an inflatable member adapted to be coupled to the outside a vehicle; a speed certain at which the inflatable member converts from a deflated position to an inflated position; and a first sidewall on the inflatable member adapted to extend rearwardly from adjacent an outside cabin wall on the vehicle when the member is in the inflated position.

In another aspect, the invention may provide an aerodynamic device includes an inflatable member convertible between an inflated position and a deflated position. When in the inflated position, the inflatable member on the aerodynamic device extends between the cabin wall on a vehicle and a leading wall on a container supported by a trailer towed by the vehicle. The inflatable member fills a gap ordinarily between the cabin wall and trailer to encourage laminar flow as truck hauls trailer through an air stream. The encouragement of laminar flow reduces drag which results in increase fuel economy for the truck's engine, amongst other advantages.

In accordance with yet another aspect, the invention may provide the combination of a tractor vehicle and towed trailer attached thereto forming a gap therebetween and an inflatable device attached to the vehicle for substantially filling the gap when the vehicle is in motion to reduce drag forces on the combination.

One other aspect may provide an aerodynamic device for mounting on the rear of a vehicle comprising a frame member for attachment to the rear of the a vehicle and an inverted generally U-shaped inflatable member attached to the frame member and adapted to extend from the rear of the vehicle toward a container supported by a trailer towed by the vehicle to reduce drag.

Another aspect of the present invention may provide a method of using an aerodynamic device comprising the steps of: mounting an inflatable member to a vehicle; and inflating the inflatable member rearwardly to fill a gap formed between the vehicle and a trailer towed by the vehicle to reduce drag.

Another aspect of the present invention may provide a method of reducing drag on a truck tractor-trailer assembly comprising the steps of mounting an inflatable member adjacent the rear of the tractor truck and inflating the inflatable member rearwardly toward the trailer to fill a gap formed between the tractor truck and trailer.

BRIEF DESCRIPTION OF THE SEVERAL VIEWS OF THE DRAWINGS

A sample embodiment of the invention, is set forth in the following description, is shown in the drawings and is particularly and distinctly pointed out and set forth in the appended claims. The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 2 is a front perspective view of the aerodynamic device on the truck;

Similar numbers refer to similar parts throughout the drawings.

DETAILED DESCRIPTION

Figure 1:
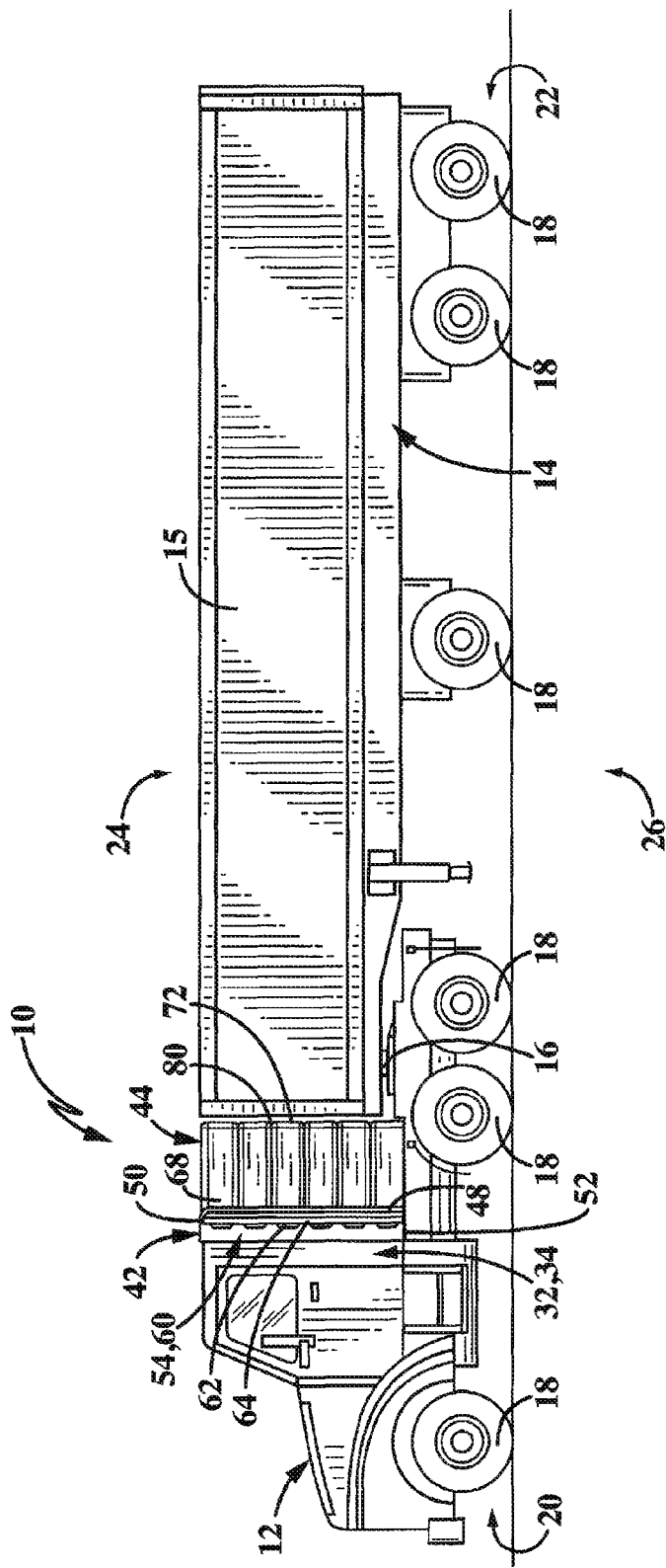
FIG. 1 is a left side elevation view of the aerodynamic device of the present invention depicting an inflated member positioned in a gap between a truck and a container supported by a trailer towed by the truck.

The new inflatable aerodynamic device or wind dam of the present invention depicted throughout FIGS. 1-7 is indicated generally as 10. As depicted in FIG. 1, aerodynamic device 10 reduces drag forces ordinarily imparted to a vehicle or truck 12 as truck 12 is hauling a container having a container wall 15 on a semi-trailer 14 via a fifth-wheel 16. Fifth wheel 16 located adjacent the ground engaging drive wheels 18.

With primary reference to FIG. 2, truck 12 includes a forward end 20 and a rear end 22 defining a longitudinal direction therebetween. A top 24 and a bottom 26 are spaced apart and define a vertical direction therebetween. A truck left side 28 is spaced apart from a truck right side 30 and defines a lateral or axial direction therebetween. Truck 12 further comprises a driver/passenger cabin 32 defined by at least four sidewalls, namely a left cabin sidewall 34, a right cabin sidewall 36, a rear cabin sidewall 38 (FIG. 3) extending axially between left and right sidewalls 34, 36 and a roof sidewall 40 above the left, right, and rear sidewalls.

Figure 3A:
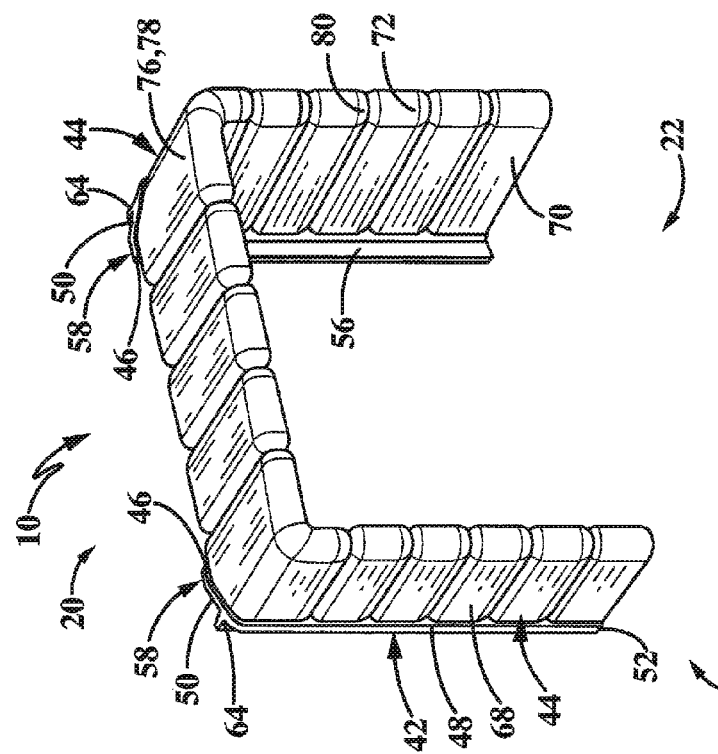
FIG. 3A is a rear perspective view of the aerodynamic device in the inflated position.
Figure 2A:
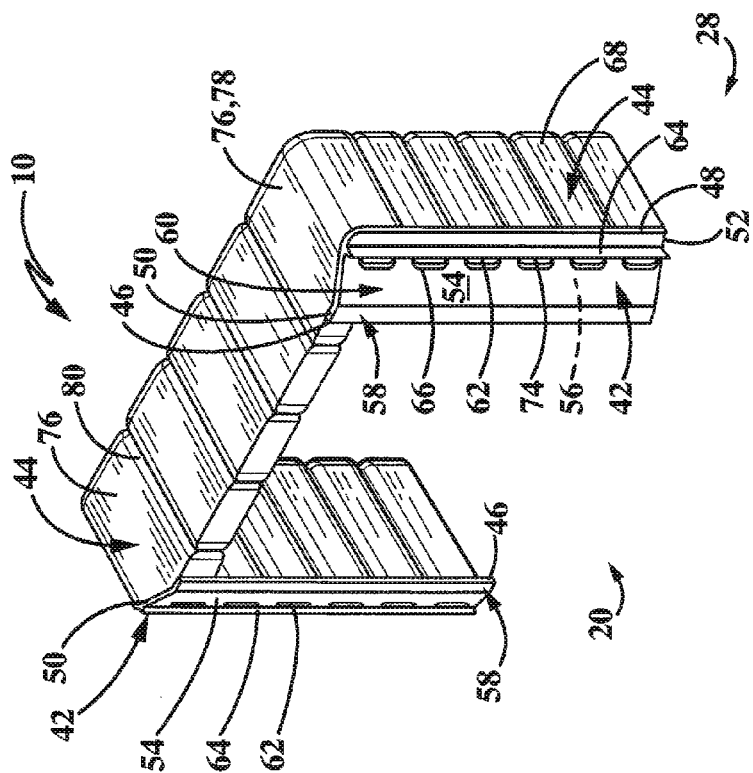
FIG. 2A is a front perspective view of the aerodynamic device in the inflated position.

With primary reference to FIG. 2A and FIG. 3A, aerodynamic device 10 comprises a support plate frame 42 and an inflatable member 44. Generally, and in one particular embodiment, frame 42 connects to the outside of truck 12. Inflatable member 44 connects to frame 42 to create a smooth or laminar aerodynamic profile as truck 12 moves through an airstream to reduce drag on the vehicle while towing trailer 14 with member 44 in an inflated position (FIG. 1).

With continued reference to FIG. 2A and FIG. 3A, frame 42 includes a pair of vertically extending rigid frame members, each frame member of frame 42 comprises an inner edge 46 spaced apart from an outer edge 48. The two edges 46, 48 are generally parallel to each other and extend vertically downward from adjacent the top 24 of cabin roof 40 when attached thereto. A top edge 50 is spaced apart from and extends generally parallel to a bottom edge 52. Top and bottom edges, 50, 52 extend between inner and outer edges 46, 48 respectively. Frame 42 further includes a forwardly and outwardly spaced facing first surface 54 opposite a rearwardly and inwardly facing second surface 56.

A planar flange 58 defines inner edge 46 on frame 42. Planar flange 58 extends vertically downward from adjacent top 24 of truck 12. Planar flange 58 is preferably connected to rear cabin wall 38 adjacent the corner formed where rear cabin wall 38 meets left side wall 34. Alternatively, flange 58 may be mounted in another position, such as connected to cabin side wall 34. A second planar flange 60 extends outwardly and rearwardly from planar flange 58. Second planar flange 60 defines outer edge 48. Second planar flange 60 on frame 42 extends downwardly from adjacent top 24 of truck 12 towards bottom 26 of truck 12.

A plurality of apertures 62 are formed in second planar flange 60 on frame 42 and are defined by aperture edge 66. Apertures 62 are preferably vertically aligned and extend from first surface 54 through frame 42 to second surface 56 through second planar flange 60. In the shown embodiment, apertures 62 are generally oblong in shape, however, clearly other aperture shapes are entirely possible. Further, while only a single vertical row of apertures is depicted in the FIG. 2A and FIG. 4, multiple columns of apertures are contemplated as well.

A lip 64 is positioned on second planar flange 60. Lip 64 extends forwardly from front surface 54. Lip 64 is positioned between inner edge 46 and outer edge 48. More particularly lip 64 is positioned adjacent aperture 62 between the aperture edge 66 and outer edge 48. Lip 64 includes a concave surface facing aperture 62, and a planar surface on opposite sides of lip 64. The concave surface of lip 64 is configured to guide air through aperture 62 as truck 12 is moving forward through an airstream while hauling trailer 14.

Inflatable member 44 comprises an outer sidewall 68 spaced apart from and generally parallel to an inner sidewall 70, and a rear wall 72 connecting outer sidewall 68 to inner sidewall 70. Sidewalls of inflatable member 44 define therein an air-containing chamber 74 configured to inflate with air as truck 12 is moving through the air stream. In one particular embodiment sidewalls 68, 70 are generally parallel and oriented along the longitudinal direction when member 44 is inflated. Chambers 74 of inflatable member 44 are joined together to form a generally inverted U-shape when viewed from the back.

Rear wall 72 is shown as arcuately extending rearwardly in a convex manner between outer sidewall 68 and inner sidewall 70. The present invention contemplates that this arcuate extension of rear wall 72 improves aerodynamic efficiency as air moves along the outer surface of inflatable member 44.

Inflatable member 44 is formed by a plurality of inflatable chambers 74 that may be aligned vertically relative to one another and are aligned with one aperture 62 on frame 42.

With continued reference to the inflatable member 44 of the first embodiment, a top inflatable member 76, may be L-shaped including a top sidewall 78 orthogonally aligned with outer sidewall 68 and generally coplanar with roof 40 on truck 12. Further, top inflatable member 76 is generally L-shaped in cross section having an inner chamber 74 that extends both vertically and axially.

Figure 3:
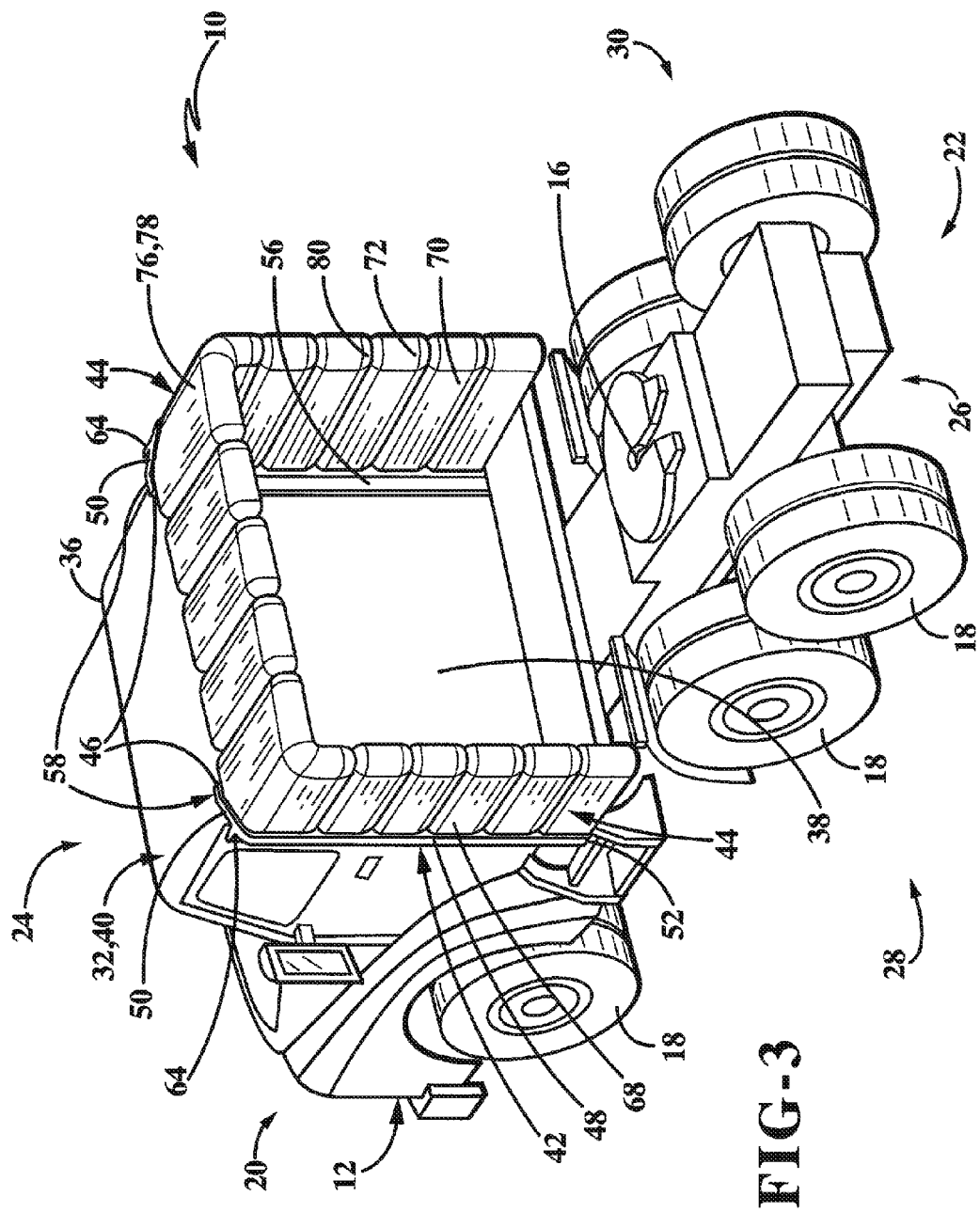
FIG. 3 is a rear perspective view of the aerodynamic device on the truck in the inflated position.
Figure 4:
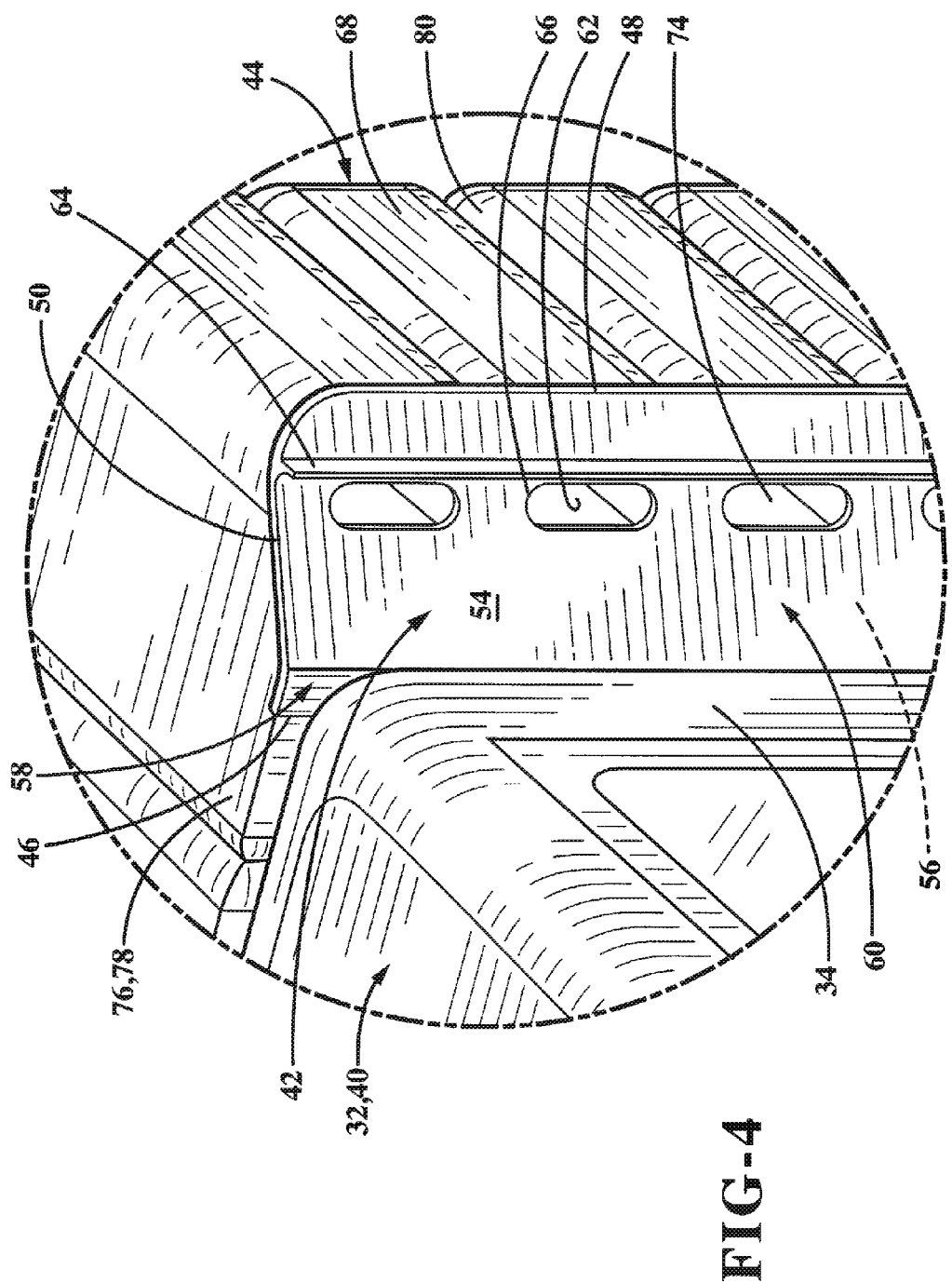
FIG. 4 is an enlarged perspective view of the region labeled "SEE FIG. 4" in FIG. 2.

A V-shaped cleft 80 is formed between adjacent pairs of chambers 74 on inflatable member 44. Cleft 80 is formed by two adjacent sidewalls 68 of two vertically aligned chambers 74 of inflatable member 44. Or, cleft 80 may be defined between two axially aligned inflatable member 44 or the sidewalls 68 of said members, such as the member 44 aligned with roof 40 as shown in FIG. 3. V-shaped cleft 80 includes a first leg defined by a first inflatable member and a second leg defined by a second inflatable member. Cleft 80 may be constructed form either similar or distinct material as the sidewalls of member 44.

Inflatable member 44 is connected to frame 42 and extends towards and terminates at rear wall 72. When trailer 14 is connected via fifth wheel 16 to truck 12, the rear wall 72 is located adjacent the forward edge of container wall 15. However, there may be some embodiments where the rear wall 72 of inflatable member 44 is located behind or rearwardly from the leading edge of container wall 15. By terminating rear wall 72 closely adjacent the front edge of container wall 15, aerodynamic device 10 permits continuous laminar flow of air over truck 12, then over the surface of inflatable member 44, and over the surface trailer 14 and container wall 15.

Figure 1A:
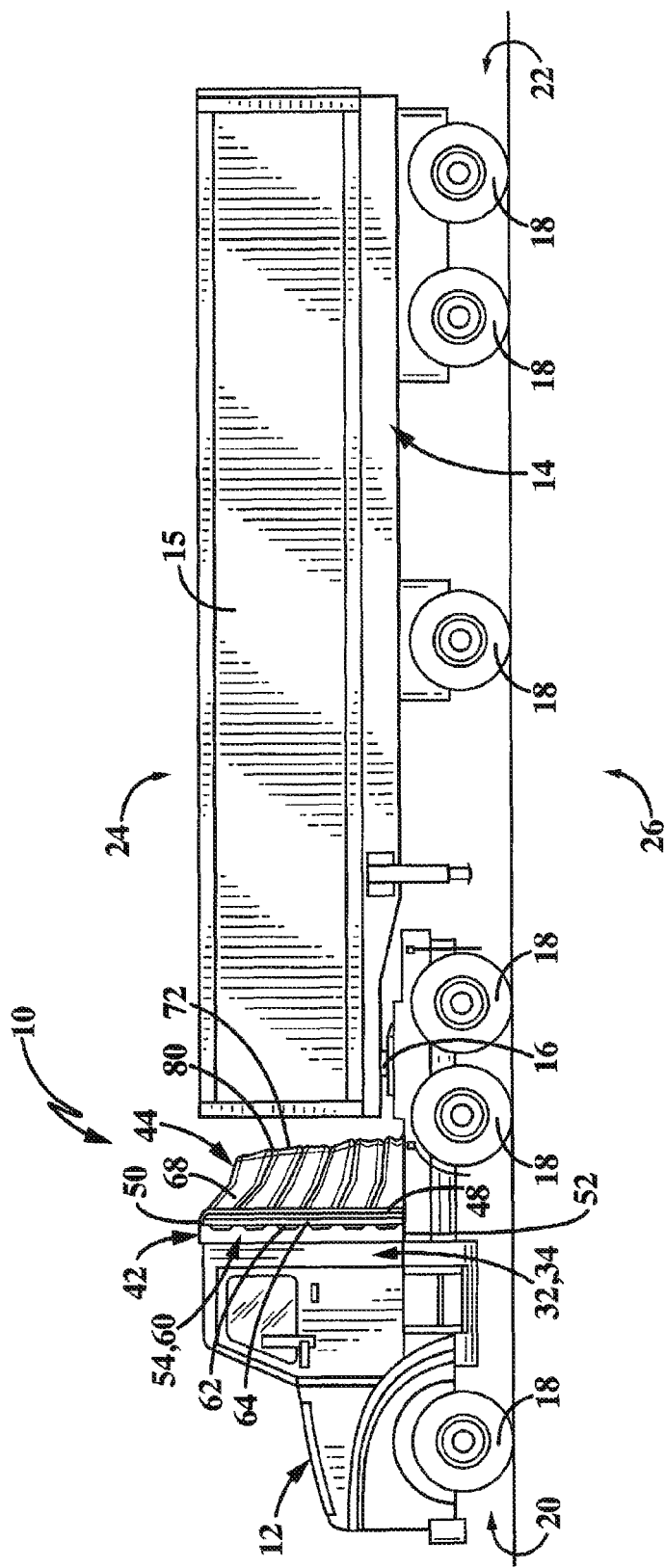
FIG. 1A is a left side elevation view of the aerodynamic device of the present invention shown in a deflated position

Inflatable member 44 is configured to inflate at a speed certain to encourage laminar flow of air over device 10 as truck 12 moves forward through the air stream. Accordingly, it is desirable that the outer surface of inflatable member 44 be constructed from a material having a low coefficient of friction to reduce drag forces thereon. Further, it is preferable that inflatable member 44 is flexible or at least semi-flexible. The flexibility of the material permits inflatable member 44 to collapse into a deflated position (FIG. 1A) when the truck is either not moving or not moving at a speed fast enough to inflate the chambers 74.

Figure 6:
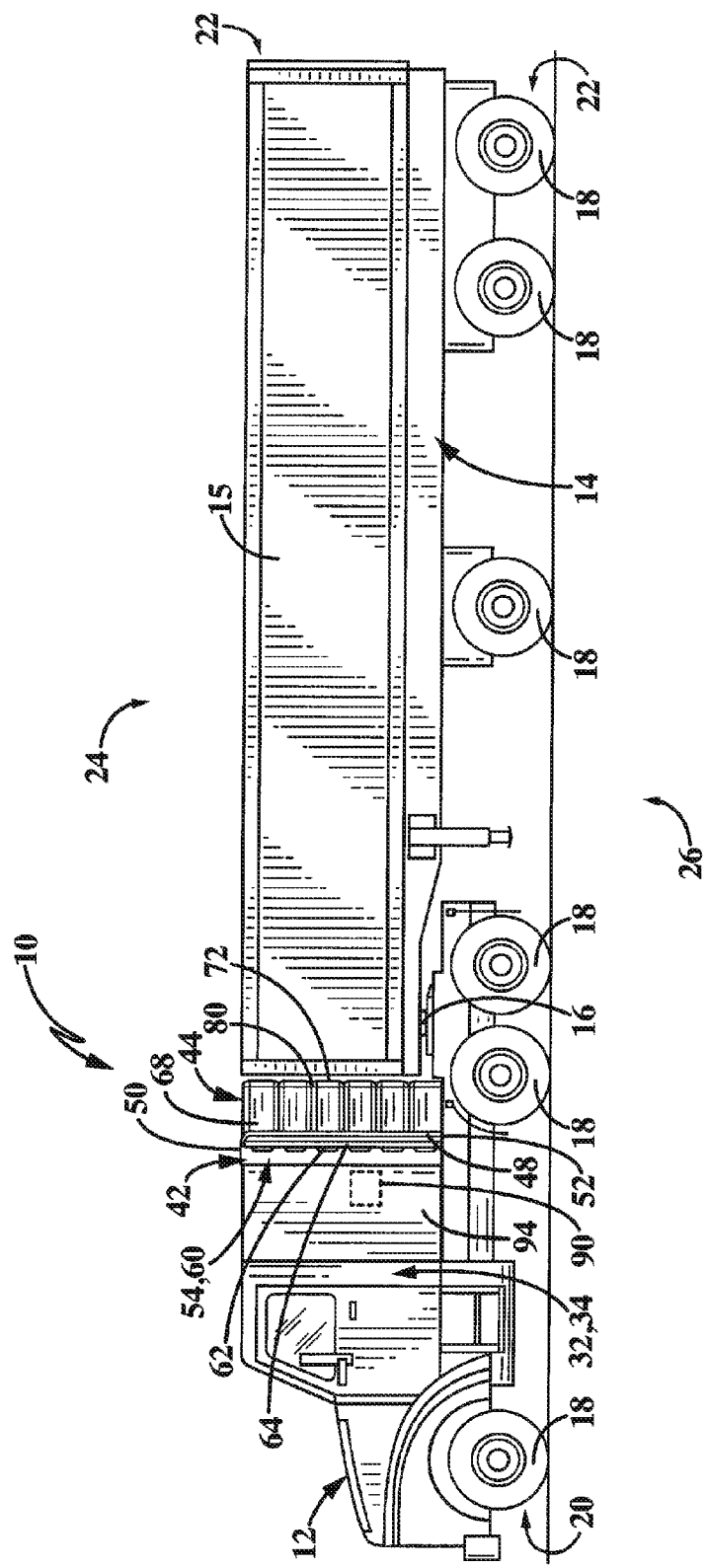
FIG. 6 is a left side elevation view of a third embodiment of the present invention.

An additional contemplated embodiment of the present invention provides an inflatable member 44 in communication with an air compressor 90 mounted to truck 12 as depicted in FIG. 6. In this embodiment, frame 42 may include or be free from any apertures. Inflatable member 44 is coupled to cabin 32 via frame 42 and member 44 is inflated with air from the air compressor.

Figure 5:
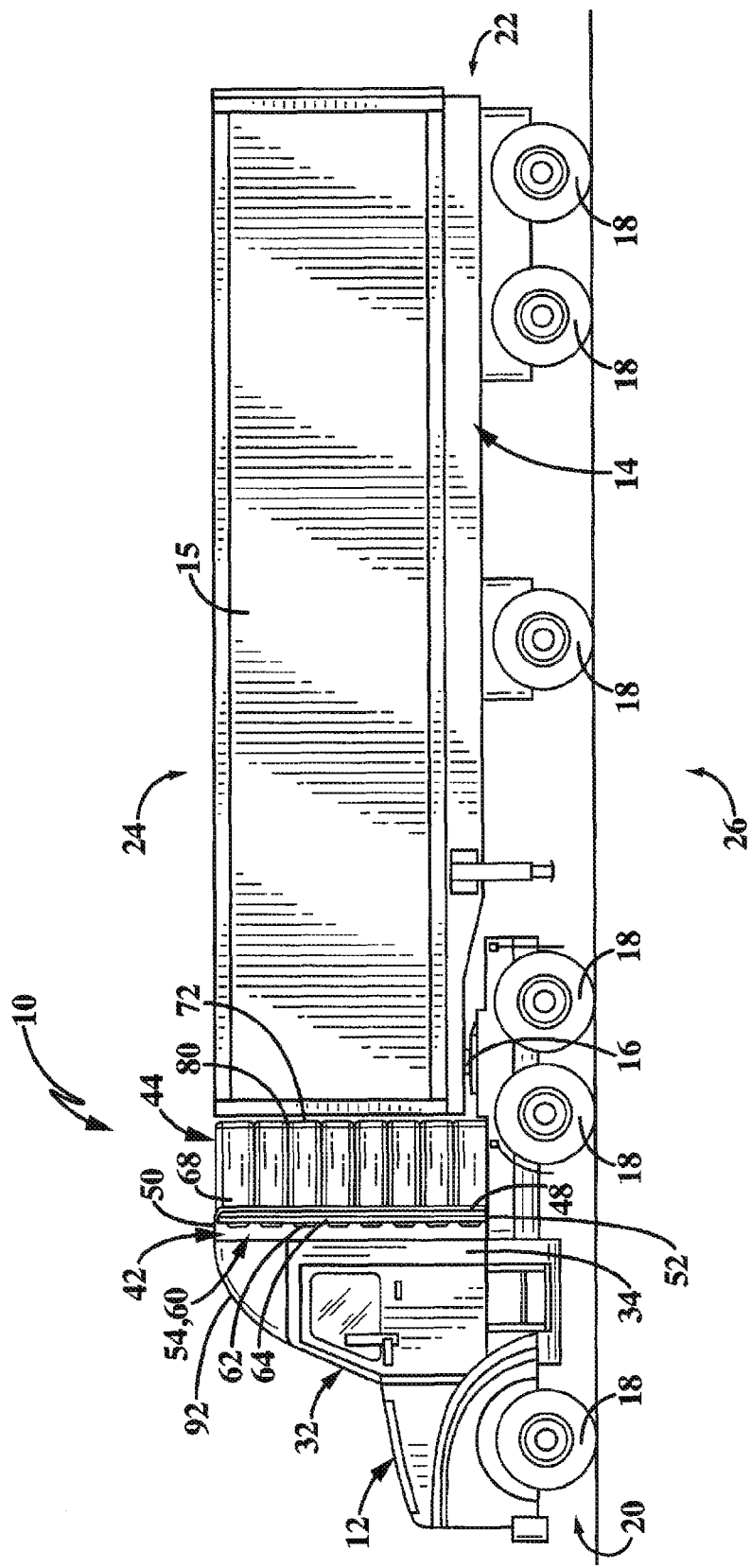
FIG. 5 is a left side elevation view of a second embodiment of the present invention.
Figure 7:
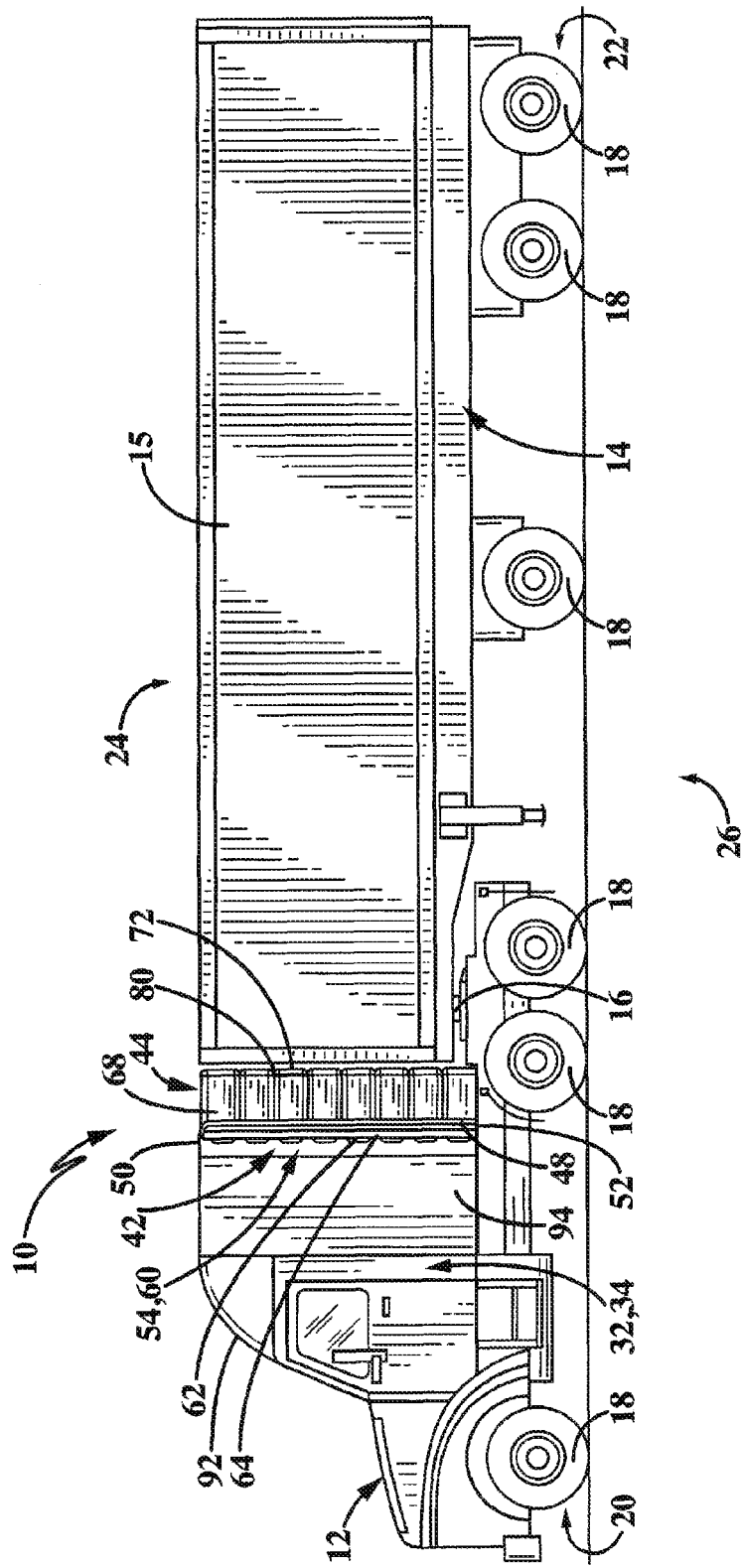
FIG. 7 is a left side elevation view of a fourth embodiment of the present invention.

The alternative embodiments of aerodynamic device 10 are depicted in FIGS. 5-7 indicating that device 10 may be configured to mount to a truck 12 having a variety cabin dimensions. By way of non-limiting example, in FIG. 5, device 10 is coupled to a truck having a roof wind scoop 92 resulting in a higher overall height. Similarly, as depicted in FIGS. 6-7, device 10 may be configured to work in association with trucks that have a longer cabin 94 resulting in a smaller gap. The small gap reduces the length of sidewalls 68, 70 compared those depicted in FIG. 1. These longer cabins 94 ordinarily include sleeping quarters positioned behind the driver's seat inside the cabin.

In accordance an aspect of the present invention, aerodynamic device 10 provides a smooth or laminar flow of a truck 12 hauling trailer 14 having container wall 15 through an air stream when in the inflated position (FIG. 1). By increasing aerodynamic efficiency, drag forces are reduced, which improves fuel economy for the truck engine, amongst other things. The laminar flow of air flowing over sidewall 68 on device 10 improves the aerodynamic efficiency of the truck 12 and trailer 14. Device 10 is disposed within a gap defined between the rear cabin wall 38 of truck 12 and the front end of trailer 14. Device 10 prevents turbulent flow of air or eddies from building up in the gap between cabin 32 and trailer 14.

Prior to operation, device 10 is preferably assembled by mounting frame 42 to cabin 32 on truck 12. The manner in which frame 42 is mounted to truck 12 can be any known method to one having ordinary skill in the art, such as bolting, riveting or welding. Inflatable member 44 is then coupled to truck 12 by attaching the inflatable member 44 to frame 42. Again, the manner in which inflatable member 44 is connected to frame 42 includes but is clearly not limited to bolting, sewing, riveting, welding, or other manners commonly known for attaching a flexible or semi-flexible material to a rigid member. While this method of assembly is preferable, clearly there may be alternative steps to assemble device 10, such as first coupling inflatable member 44 to frame 42, then mounting frame 42 to truck 12.

In operation, device 10 begins in a deflated position. The flexible construction of inflatable member 44 permits it to lay adjacent cabin 32 on truck 12. Truck 12 then moves forward through an air stream, preferably hauling cargo in container on trailer 14. As the truck engine drives wheels 18 to move the truck 12 forward, air moves rearward over the hood of the truck and eventually over and around cabin 32. Air moves past cabin 32 and flows over frame 42, and in particular at least along second planar flange 60. Air continues to flow on flange 60 towards apertures 62. The air flow is then split into at least two portions. An inflating first portion of air flow is guided through apertures 62 by lip 64, and an outer second portion of air flows over aperture 62 and over lip 64.

The inflating first portion of air moves through apertures 62 into chambers 74. The inflating first portion of air is retained within chambers 74 by sidewalls 68, 70 and rear wall 72. The first portion of air moves inflatable member 44 from the deflated position to the inflated position. In the inflated position, inflated member 44 extends from adjacent cabin 32 towards trailer 14.

The outer second portion of air moves over lip 64 and rearward along the outside of sidewall 68. Second portion of air moves smoothly in a laminar flow over sidewall 68 outer surface. Second portion of air also moves along cleft 80 in a laminar manner. From outer sidewall 68, air continues to flow in a laminar manner over and around trailer 14. Further, in one particular embodiment a wall on container wall 15 is coplanar with the first sidewall 68 of inflatable member 44.

In another particular embodiment, inflatable member 44 on device 10 inflates from a deflated position (FIG. 1A) to an inflated position (FIG. 1) when truck 12 reaches a speed certain. In one particular embodiment the inflation speed certain is approximately 40 miles per hour (mph). However, clearly other speeds between 40 mph and 60 mph, or even 0 mph to 100 mph, are contemplated. To direct the speed at which member 44 inflates, the size of lip 64 or the diameter/shape of edge 66 defining apertures 62 may be adjusted. While the present invention provides a static aperture, clearly dynamically adjustable aperture diameters are contemplated. Further it is contemplated that frame 42 may be free of any apertures and lip on frame 42, and in this case a conventional air compressor 90 may be mounted to truck 12 including an air source output connected to a source line at a first end. A second end of the source line may be in communication with chamber 74 to inflate member 44. In this embodiment, inflatable member 44 may be selectively inflated and deflated by the operator.

In another particular embodiment, a method of use or operation the present invention device 10 is provided. The method of reducing drag on a truck tractor-trailer assembly comprises the steps of mounting an inflatable member adjacent the rear of the tractor truck and inflating the inflatable member rearwardly toward the trailer to fill a gap formed between the tractor truck and trailer. In this method the step of inflating the inflatable member may be accomplished by moving ambient air through a plurality apertures formed in a frame connecting the inflatable member to the truck as the truck moves forwardly. Additionally, the step of inflating the inflatable member may further comprise the step of inflating the inflatable member at a speed certain of the vehicle, wherein the speed certain is within a range from about 20 mph to about 60 mph. And even more particularly, the speed certain may be within a particular range from about 40 mph to about 45 mph.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the invention are an example and the invention is not limited to the exact details shown or described.

What is claimed:
1. An aerodynamic device for a vehicle comprising:
   a frame adapted to be mounted adjacent a rear cabin wall on a vehicle, and the frame including a planar flange projecting outwardly from the rear cabin wall on the vehicle, and a plurality of apertures formed in the planar flange, wherein the plurality of apertures are vertically aligned; and an inflatable member coupled to the frame extending rearwardly from the vehicle to reduce drag forces.

2. The device of claim 1, further comprising:

a pair of rigid vertical frame members forming the frame; and a plurality of distinct inflatable chambers defined by the inflatable member joined together to form a generally inverted U-shape configuration.

3. The device of claim 1, further comprising:

a plurality of distinct air containing chambers formed in the inflatable member and wherein one distinct chamber is aligned with the at least one aperture.

4. The device of claim 1, further comprising a lip projecting forwardly from a forward facing surface of the frame.

5. The device of claim 1, further comprising:

a lip extending forwardly from a front surface of the frame and positioned radially outward from the plurality of apertures to guide flowing air through the apertures into the inflatable member when moving forward.

6. The device of claim 1, further comprising a longitudinally aligned cleft formed along an outer surface on the inflatable member between adjoining distinct air chambers.

7. The device of claim 1, wherein each aperture in the plurality of apertures has an oblong profile when viewed from the front.

8. The device of claim 1, wherein the plurality of apertures define a single row of apertures.

9. The device of claim 8, further comprising a forwardly projecting lip positioned intermediate the single row of apertures and an outermost terminal edge of the planar flange.

10. The device of claim 9, wherein the lip comprises a concave surface facing the single row of apertures configured to guide air therethrough while moving forward.

11. The device of claim 10, further comprising a outwardly facing planar flat surface on the lip opposite the concave surface.

12. The device of claim 1, wherein the planar flange projects outwardly and rearwardly from the rear cabin wall on the vehicle.

13. An aerodynamic device for mounting on the rear of a vehicle comprising:

a frame member attached to a rear cabin wall on a truck adapted to tow a trailer, and a plurality of apertures formed in the frame member, wherein the plurality of apertures are vertically aligned; and an inverted generally U-shaped inflatable member collectively formed from a plurality of distinct inflatable air chambers connected together and attached to the frame member and adapted to extend from the rear of the truck to reduce drag.

14. A method of reducing drag on a truck tractor-trailer assembly comprising the steps of:

mounting an inflatable member having a plurality of distinct air chambers adjacent the rear of the tractor truck in a gap defined between a rear cabin wall on the truck and a forward wall on the trailer; and inflating the inflatable member rearwardly toward the trailer to fill a gap formed between the tractor truck and trailer, wherein the step of inflating the inflatable member is accomplished by moving ambient air through a plurality apertures formed in a frame connecting the inflatable member to the tractor truck as the tractor truck is moving forward.

15. The method of claim 14, wherein the step of inflating further comprises the steps of:

inflating the inflatable member at an inflating speed of the tractor truck, wherein the inflating speed is within a range from about 20 mph to about 60 mph.

16. The method of claim 15, wherein the range is from about 40 mph to about 45 mph.

17. An aerodynamic device for a vehicle comprising:

a frame mounted adjacent a rear cabin wall on a vehicle, and the frame including a planar flange projecting outwardly from the rear cabin wall on the vehicle, and a lip projecting forwardly from a forward facing surface of the planar flange; and an inflatable member coupled to the frame extending rearwardly from the vehicle to reduce drag forces.

* * * * *